(12) United States Patent
Lanoye

(10) Patent No.: US 6,204,321 B1
(45) Date of Patent: *Mar. 20, 2001

(54) SEALANT AND ADHESIVE WITH DAMPING PROPERTIES

(75) Inventor: Thierry Lanoye, Cosne-sur-Loire (FR)

(73) Assignee: Henkel Corporation, Gulph Mills, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/663,129

(22) PCT Filed: Dec. 8, 1994

(86) PCT No.: PCT/EP94/04085

§ 371 Date: Jul. 17, 1996

§ 102(e) Date: Jul. 17, 1996

(87) PCT Pub. No.: WO95/16741

PCT Pub. Date: Jun. 22, 1995

(30) Foreign Application Priority Data

Dec. 17, 1993 (EP) .................................................. 93120384

(51) Int. Cl.$^7$ .............................. B05D 3/02; C08K 27/00
(52) U.S. Cl. ................... 524/571; 427/383.1; 427/383.7; 427/388.1; 427/388.2
(58) Field of Search ........................ 524/571; 427/383.1, 427/383.7, 388.1, 388.2

(56) References Cited

U.S. PATENT DOCUMENTS

| | | | |
|---|---|---|---|
| 4,075,288 | 2/1978 | Graveron et al. | 260/879 |
| 4,118,258 | 10/1978 | Graveron et al. | 156/60 |
| 4,808,657 | 2/1989 | Brown | 524/518 |
| 5,227,592 | 7/1993 | Kösters et al. | 181/207 |
| 5,356,994 | 10/1994 | Koch | 525/98 |
| 5,403,623 | 4/1995 | Kösters et al. | 427/407 |

FOREIGN PATENT DOCUMENTS

| | | |
|---|---|---|
| 1248271 | 1/1989 | (CA) . |
| 2000569 | 4/1990 | (CA) . |
| 1305806 | 7/1992 | (CA) . |
| 34 44 863 | 7/1986 | (DE) . |
| 38 34 818 | 10/1988 | (DE) . |
| 40 13 318 | 10/1991 | (DE) . |
| 41 20 502 | 12/1992 | (DE) . |
| 41 22 849 | 1/1993 | (DE) . |
| 097 394 | 1/1984 | (EP) . |
| 181 441 | 5/1986 | (EP) . |
| 309 903 | 4/1989 | (EP) . |
| 356 715 | 3/1990 | (EP) . |
| 358 598 | 3/1990 | (EP) . |
| 2 255 313 | 7/1975 | (FR) . |
| 51 038 356 | 10/1976 | (JP) . |

OTHER PUBLICATIONS

DIN 53 440, Teil 3, Jan. 1984.

Primary Examiner—Peter D. Mulcahy
(74) Attorney, Agent, or Firm—Wayne C. Jaeschke; Stephen D. Harper

(57) ABSTRACT

A curable sealant, adhesive and coating composition which provides vibration dampening to a substrate to which it is applied. The composition contains from 5% to 40% by weight of 3, 4-polyisoprene, a curing agent, at least one of a liquid rubber or elastomer and at least one additional additive. The composition is applied to the substrate and heat cured.

18 Claims, 3 Drawing Sheets

SEALANT AND ADHESIVE WITH DAMPING PROPERTIES

BACKGROUND OF THE INVENTION

1. Field of the invention

Figure 1:
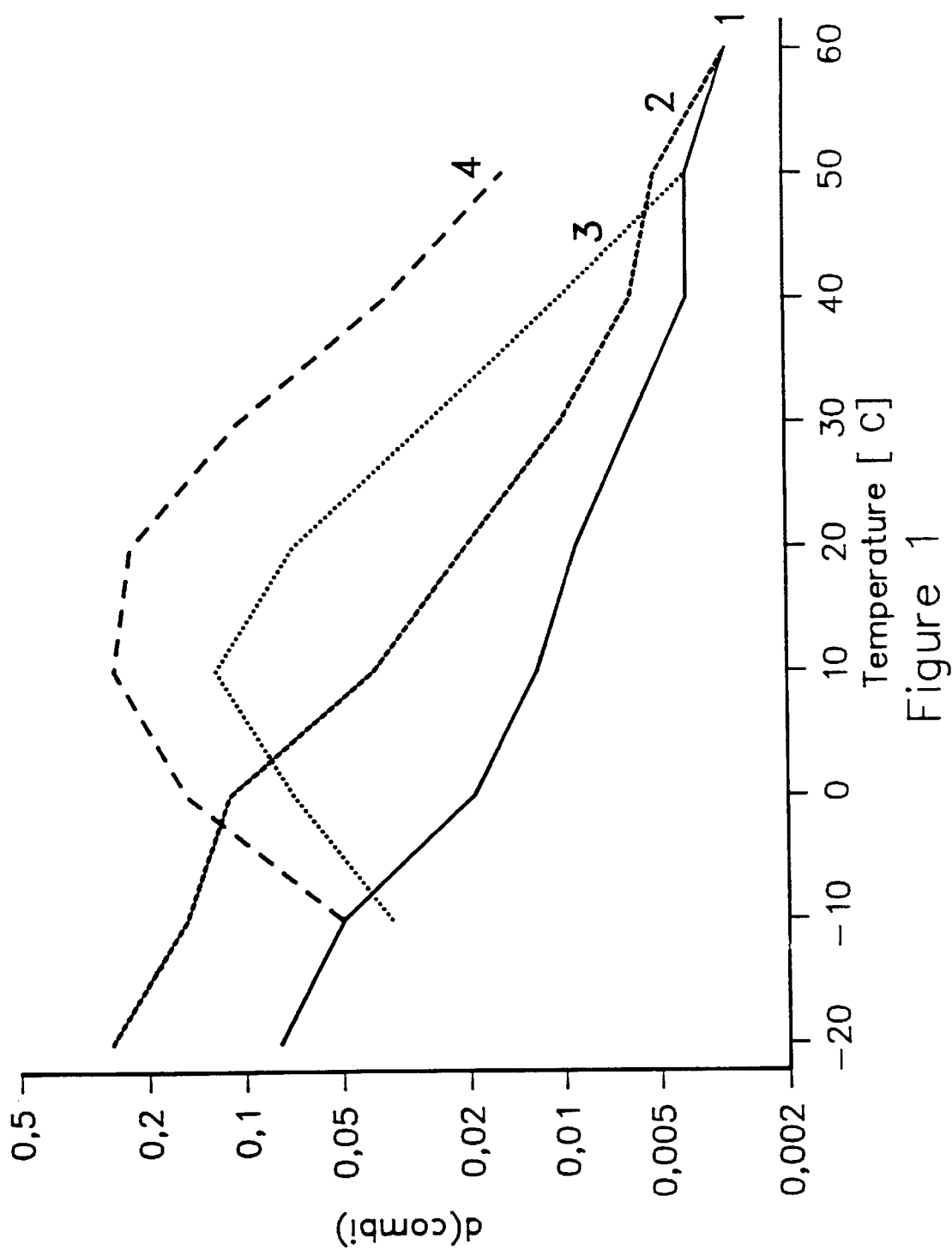

This invention relates to novel compositions for adhesives sealants and/or coatings containing 3,4-polyisoprenes. More particularly this invention involves curable and non-curable compositions for adhesives sealants and/or coatings containing conventional polymeric components and in addition 3,4-polyisoprenes. A preferred field of application for these compositions is the vehicle industry, especially the automotive industry.

2. Discussion of Related Art

In the manufacture and assembly of automobiles, adhesives sealants and coatings are used for a variety of different purposes. Sealants and adhesives are selected mainly on the base of the following properties:

strength, i.e. shear strength, peel strength elongation, flexibility durability ease of application.

For coatings, especially underbody coatings, abrasion resistance is an additional criterion. In view of reducing the complexity of car manufacturing and thus reducing manufacturing costs, there is a need for "multifunctional" products, i.e. sealants, adhesives and/or coatings which solve additional problems in addition to their prime function.

Contemporary design of vehicles, machines and appliances involves almost exclusively the use of thin gauge sheet metal. Moving parts and running engines cause vibration of these thin metal structures, which in turn create noise. Numerous methods for noise abatement are known, however, most of these methods require additional manufacturing steps and/or components which have only the function of vibration damping. A prime example of the conventional products for vibration damping are highly filled bitumen pads. These pads have to be extruded, die-cut and shaped in separate steps. Prior to application they frequently have to be heat formed to fit them to non flat structures and then glued to the car body, machine or appliance. Numerous attempts have been made to replace this costly manual procedure by products which can be easily applied by robots. Plastisol formulations serving the dual function of underbody coating (projection against abrasion) and acoustic damping have been described in EP-A-358598, or DE-A-3444863. DE-A-4013318 discloses a two layer underbody coating which performs the dual functions of protecting against abrasion and absorbing noise resulting from impact (stones, gravel, water, etc.). Whereas these products/processes are quite useful for combining the functions of underbody coating and noise abatement, there still remains a need to combine the function of an adhesive and/or sealant with noise reduction. This is particularly desirable for those parts of a car, machine or appliance that do not require a specific coating for protection against abrasion such as trunk and hood lids, doors or fire walls of a car.

Adhesives and sealants for these parts are normally applied early on in production, in the so-called "body shop". Hence, they are applied to the bare, uncleaned metal which is frequently covered with an oil for rust protection. Although plastisols, PVC-plastisols in particular, are used in the body shop, those disclosed in EP-A-358598 or DE-A-3444863 are not suitable as adhesives/sealants for bare metal substrates. The plastisol formulations which are especially designed for bare metal application have poor to no vibration damping properties.

Another class of adhesives/sealants suitable for body shop application are based on rubbers especially vulcanizing compositions based on 1,3-polybutadienes and/or 1,3-polyisoprenes. These preferably contain liquid, low molecular weight polydienes, sulfur and optionally accelerators for sulfur vulcanization. In addition, these formulations may contain solid high molecular weight rubbers, whereby the liquid polydiene(s) and/or the solid rubber may contain functional groups such as hydroxyl groups, carboxylic groups, anhydride groups or epoxy groups. This class of rubber based adhesives/sealants has been the subject of various patent applications, e.g. EP-A-97394, EP-A-309903, DE-A-3834818, DE-A-4120502, DE-A-4122849, EP-A-181441 and EP-A-356715. Although DE-A-4122849 and EP-A-181441 mention a potential use of these compositions for vibration damping and/or sound damping, no reference is made to the efficacy of these compositions for vibration damping, because to the best of applicant's knowledge these materials have not been used for their combined adhesive/sealant and vibration damping properties. The use of 3,4-polyisoprenes for sealants, adhesives and coatings has thus far not been described.

SUMMARY OF THE INVENTION

In accordance with the present invention, it has been found that 3,4-polyisoprene can be combined with other curable or non-curable liquid and/or solid rubbers or liquid polyolefins to provide adhesive and sealant formulations with superior vibration damping properties. Surprisingly, the incorporation of 3,4-polyisoprenes into sealant/adhesive formulations does not have a detrimental effect on other desired properties of the formulations, i.e. applicability, curing speed, adhesion, strength and/or elasticity.

DETAILED DESCRIPTION OF THE INVENTION

In addition to 3,4-polyisoprene, sealant/adhesive formulations according to the present invention may contain at least one of the following items:

one or more liquid or solid rubbers or elastomers thermoplastic polymers in the form of finely divided powders fillers tackifiers and/or adhesion promoters plasticizers/extenders curatives, accelerators, catalysts stabilizers, antioxidants rheology improvers.

3,4-polyisoprenes according to this invention are polyisoprenes with a significant content of at least 30%, and preferably 55% to 70% of 3,4-polyisoprene, as determined by NMR-spectroscopy. Although the preferred 3,4-polyisoprenes are high molecular weight (MW) polymers, i.e. MW 200000 and above, it can be advantageous for some formulations to use low molecular weight liquid 3,4-polyisoprenes as additives to conventional plastisols, for example.

The compositions according to this invention may contain up to 40% by weight of 3,4-polyisoprene, preferably less than 20% by weight of 3,4-polyisoprene, and more preferably 5% to 15% by weight of 3,4-polyisoprene. Acoustical damping characteristics can be varied according to the amount of 3,4-polyisoprene added, as evidenced by corresponding changes in the loss factor. To a lesser extent, the effective useful temperature range over which the loss factor is increased also appears to be somewhat dependent upon the amount of 3,4-polyisoprene added.

Suitable additional liquid rubbers or elastomers can be selected from among the following homo- and/or copolymers: polybutadienes, especially the 1,3- and 1,2-polybutadienes which may have terminal and/or pendant functional groups such as hydroxy-, carboxylic acid-, carboxylic anhydride-, or epoxy groups, polybutenes, polyisobutylenes, 1,4-polyisoprenes, styrene-butadiene-copolymers, butardiene acrylonitrile copolymers, polyurethanes and polyepoxides. The MW of the liquid rubbers is typically below 20000, preferably between 2000 and 10000. The amount of liquid rubbers in the composition depends upon the desired rheology of the uncured formulation and the desired mechanical properties and acoustic damping properties of the cured formulation. In general, the amount of liquid rubbers or elastomers varies from about 5 to 50 percent by weight.

Suitable solid rubbers, which usually have a significantly higher MW than the liquid rubbers (100000 or higher), include polybutadiene (preferably with high cis-1,4-content), styrene butadiene rubber, butadiene acrylonitrile rubber, isoprene rubber, butyl rubber and polyurethane rubber.

Examples of thermoplastic polymers are polypropylene, polyethylene, thermoplastic polyurethanes, methacrylate copolymers, styrene copolymers and PVC.

Fillers can be selected from a wide variety of materials including chalk, calciumcarbonate (natural ground or precipitated), silicates, barytes and carbon black. Also, flake type fillers such as vermiculite, mica, talc or similar layered silicates are suitable. In some formulations such flake type fillers have shown improved vibrational damping efficacy. The total amount of fillers can vary between 10 to 70 percent by weight, with the preferred range from 25 to 60 percent by weight.

Tackifiers and/or adhesion promoters may include hydrocarbon resins, phenolic resins, terpene phenolic resins, modified or unmodified rosin acids and esters, polyamines, polyaminoamides, polyepoxy resins and anhydrides and anhydride-containing copolymers.

The type and amount of tackifier(s) depends upon the polymer composition of the sealant/adhesive, the strength of the cured composition, and the substrate to which the sealant/ adhesive is applied. Typical tackifier resins such as the terpene phenolic resins or rosin derivatives are generally used in concentrations of about 5 to 20 percent by weight, and preferably between 7 and 15 percent by weight. Typical adhesion promoters such as polyamines or polyaminoamides are normally used in the range from about 0.5 to about 10 percent by weight.

A great number of products are suitable for use as plasticizers or extenders, including $C_4$- to $C_{14}$-dialkylesters of phthalic acid and $C_4$- to $C_{14}$-dialkylesters of $C_3$- to $C_8$-dicarboxylic acids, as exemplified by dioctyladipate, aliphatic, aromatic or naphthenic oils, low molecular weight polybutenes or polyisobutylenes, high boiling hydrocarbon fluids and mixtures thereof. The rheology of the uncured formulation and the mechanical properties including the vibration damping can be influ-enced to a certain extent by the amount of plasticizer and/or extender. Generally, plasticizer(s)/extender(s) are used in the range of 5 to 40 percent by weight.

Appropriate curatives, accelerators or catalysts depend upon the reactive and/or functional groups of the polymers selected. For curing the olefinic double bonds of liquid or solid rubbers, including 3,4-polyisoprene, a sulfur vulcanizing system is used.

A variety of organic and inorganic accelerators can be used alone, or in combination with sulfur powder. Examples of these accelerators are mercaptobenzothiazoles, dithiocarbamates, sulfenamides, disulfides such as dibenzothiazole disulfide and/or thiuram disulfides, aldehyde amine accelerators, guanidines and metal oxides such as zinc oxide. In addition, other typical rubber vulcanizing agents such as fatty acids (e.g. stearic acid) may be present in the formulation. The amount of sulfur can vary widely from zero (in unvulcanized systems) to about 15 percent by weight, preferably to about 10 percent. Similarly, the amount of accelerator(s) can vary between zero and about 10 percent. The amount of metal oxides is in the range of zero to about 10 percent.

Stabilizers may be used for protection against thermal, thermooxidative or ozone degradation. They can be selected from among conventional stabilizers such as sterically hindered phenols or amines. The amount of stabilizer used is usually in the range of 0.1 to 5 percent by weight.

Although rheology is normally adjusted by the appropriate type and amount of fillers, conventional rheology improvers such as fumed silicas or bentonites can be present in the range of about 0.1 to 7 percent by weight. In addition, other conventional additives may be present in the formulations.

The acoustical damping efficacy of the compositions according to the present invention can be tailored to the specific needs of the application with respect to the maximum loss factor and the temperature range of the effective loss factor. The governing parameters are the vulcanizing system (amount of sulfur, amount of accelerator) and the rubbers incorporated. To a lesser extent, the fillers also influence the maximum loss factor and the corresponding temperature. In addition, the thickness of the applied material influences the damping factor, whereby foamed materials exhibit a higher damping factor, although this may not be applicable in cases where a high tensile strength is required for the adhesive. In most cases, it is desirable that the peak value of the loss factor should occur approximately at room temperature (about 20° C.) and that a sufficiently high loss factor be achieved over a broad temperature range. The curing conditions for the adhesive/sealant compositions according to the invention can be tailored to the specific application; usually, the curing takes place at temperatures between 80° C. and 240° C. in 10 to 35 minutes.

The present invention may be further appreciated by reference to the following specific examples. As will be readily apparent to one skilled in the relevant art, these examples are illustrative of various parameters of the present invention, but they in no way limit its scope, except to the extent that any parameters shown in the examples may be incorporated into the appended claims.

The damping property (dissipation or loss factor) in these examples was determined according to the Oberst method (DIN 53440) on steel strips which had been coated with a defined layer of the adhesive/sealant composition, followed by curing in a conventional laboratory oven.

All parts given in the formulations below are parts by weight unless otherwise stated.

EXAMPLES 1–5

The following components were thoroughly mixed in a Z-blade kneader:

|  | 1 | 2 | 3 | 4 | 5 |
|---|---|---|---|---|---|
| 3,4-polyisoprene[1] | 10 | 10 | 10 | 10 | 10 |
| chalk[2] | 35 | 31.5 | 31 | 31 | 31 |
| precipitated calciumcarbonate[3] | 24 | 25 | 25 | 25 | 24 |
| terpene phenolic resin[4] | 10 | 10 | 10 | 10 | 10 |
| naphthenic | 5 | 5 | 5 | 5 | 5 |
| polyisobutylene[6] | 15 | 15 | 15 | 15 | 15 |
| antioxidant[7] | 1 | 1 | 1 | 1 | 1 |
| calciumoxide[8] | 0 | 1 | 1 | 1 | 1 |
| zinc oxide, active | 0 | 1 | 1 | 1 | 1 |
| sulfur powder | 0 | 0 | 0.5 | 0 | 1.0 |
| Dibenzothiazole disulfide (MBTS) | 0 | 0.5 | 0.5 | 1.0 | 1.0 |
| Lap shear strength (MPa)[a] | 0.06 | n.a. | n.a. | n.a. | 1.2 |

[1] 3,4 content (according to NMR) approx. 60%, Mooney viscosity 65/100° C. (ML4)
[2] natural ground, median particle size 4.5 $\mu$m
[3] stearate coated, median particle size 0.07 $\mu$m
[4] Dertophene T (RTM), softening point 93–97° C. (ball and ring)
[5] Nyflex 820 (RTM), Nynas-Petroleum
[6] Oppanol B 10 (RTM), BASF
[7] N,N'-Di(1,4-dimethylpentyl)-1,4-phenylenediamine
[8] Coated with stearic acid
[a] 2 mm layer between steel cupons, cured 30 min at 155° C., cohesive failure.

Comparative Example 1

A PVC plastisol was prepared by mixing the following components:

| | |
|---|---|
| paste grade emulsion PVC | 32.0 |
| dioctylphthalate | 30.0 |
| natural ground chalk | 16.5 |
| precipitated calciumcarbonate | 6.0 |
| calciumoxide | 3.0 |
| metal oxides (colour pigments) | 1.0 |
| carbon black | 0.1 |
| stabilizer | 1.0 |
| adhesion promoter | 2.0 |
| fumed silica | 0.4 |
| hydrocarbon extender | 8.0 |

EXAMPLE 6

Comparative Example 2 (Comp.2)

The following ingredients were thoroughly mixed in a Z-blade kneader.

|  | Comp. 2 | 6 | 7 |
|---|---|---|---|
| solid rubber[1] | 2.7 | — | — |
| 3,4-polyisoprene[2] | — | 5.0 | 10.0 |
| liquid polybutadiene[3] | 8.9 | 8.9 | 7.0 |
| liquid polybutadiene[4] | 17.8 | 15.5 | 12.0 |
| carboxylated polybutadiene[5a] | 8.9 | 8.9 | — |
| benzylated polybutadiene[5b] | — | — | 8.0 |
| precipitated calciumcarbonate[6] | 12.1 | 12.1 | 12.1 |
| chalk[7] | 12.1 | 12.1 | 12.0 |
| talc | 18.6 | 18.6 | 21.0 |
| calciumoxide | 5.6 | 5.6 | 5.5 |
| carbon black | 0.5 | 0.5 | 0.1 |
| antioxidant[8] | 0.5 | 0.5 | 0.5 |
| zinc oxide, active | 4.3 | 4.3 | 4.0 |
| sulfur powder | 3.0 | 3.0 | 2.5 |
| Dibenzothiazole disulfide (MBTS) | 5.0 | 5.0 | 5.3 |
| Lap shear strength (MPA)[a] | 1.4 | 1.5 | 1.2/1.8 |

[1] high cis-1,4 (98%) polybutadiene, Mooney viscosity 48/100° C. (ML4)
[2] 3.4 content approx. 60% (according to NMR), Mooney viscosity 65/100° C. (ML4),
[3] MW approx. 1800, cis 1,4-content: approx. 72%
[4] MW approx. 1800, vinyl-content: approx. 40–50%,
[5a] polybutadiene/maleic anhydride adduct, MW approx. 1700,
[5b] polybutadiene with terminal benzylgroups., MW approx. 900
[6] stearate coated, median particle size 0.07 $\mu$m,
[7] natural, ground, median particle size 4.5 $\mu$m
[8] N,N'-Di(1,4-dimethylpentyl)1,4-phenylmediamine.
[a] 2 mm layer between steel, comp. example 2 and example 6, cured 30 min at 155° C.; example 7 cured 30 min at 170° and 30 min at 200° C. respectively, cohesive failure in all cases.

Acoustic Damping Properties

Spring steel strips 240 mm×10 mm, 1 mm thick were coated on a 200 mm long section with a layer of the compositions described in examples 1 to 6 and comparatative examples 1 and 2. The coating thickness is given below. The coated steel strips were cured in a laboratory oven for 30 min at 190° C., unless otherwise stated. The cured strips were subsequently submitted to a bending vibration test according to DIN 53440 (Oberst-Method). As can be seen from FIGS. 1 to 3, the compositions containing 1,4-polyisoprene exhibit a significant damping factor at normal service temperatures (−10° C. to 30° C.), moreover, examples 2 to 5 demonstrate clearly, that by slightly changing in the vulcanizing system, one can optimize the temperature range of maximum loss factor to the desired region. Example 6 and 7 demonstrate that incorporation of 3.4-polyisoprene into conventional vulcanizing rubber sealant/adhesives (comparatative example 2) improves the damping factor of the cured sealant/adhesive significantly without sacrificing on the shear strength property.

Also, example 7 shows clearly that a higher curing temperature increases the shear strength of the cured adhesive although one probably might expect this. But surprisingly, also the vibration damping as measured by the Oberst method is increased, in addition this increased damping factor is observed over a broader temperature range compared to the same formulation cured at the lower temperature, see curve 14 vs curve 15 of FIG. 3.

Figure 2:
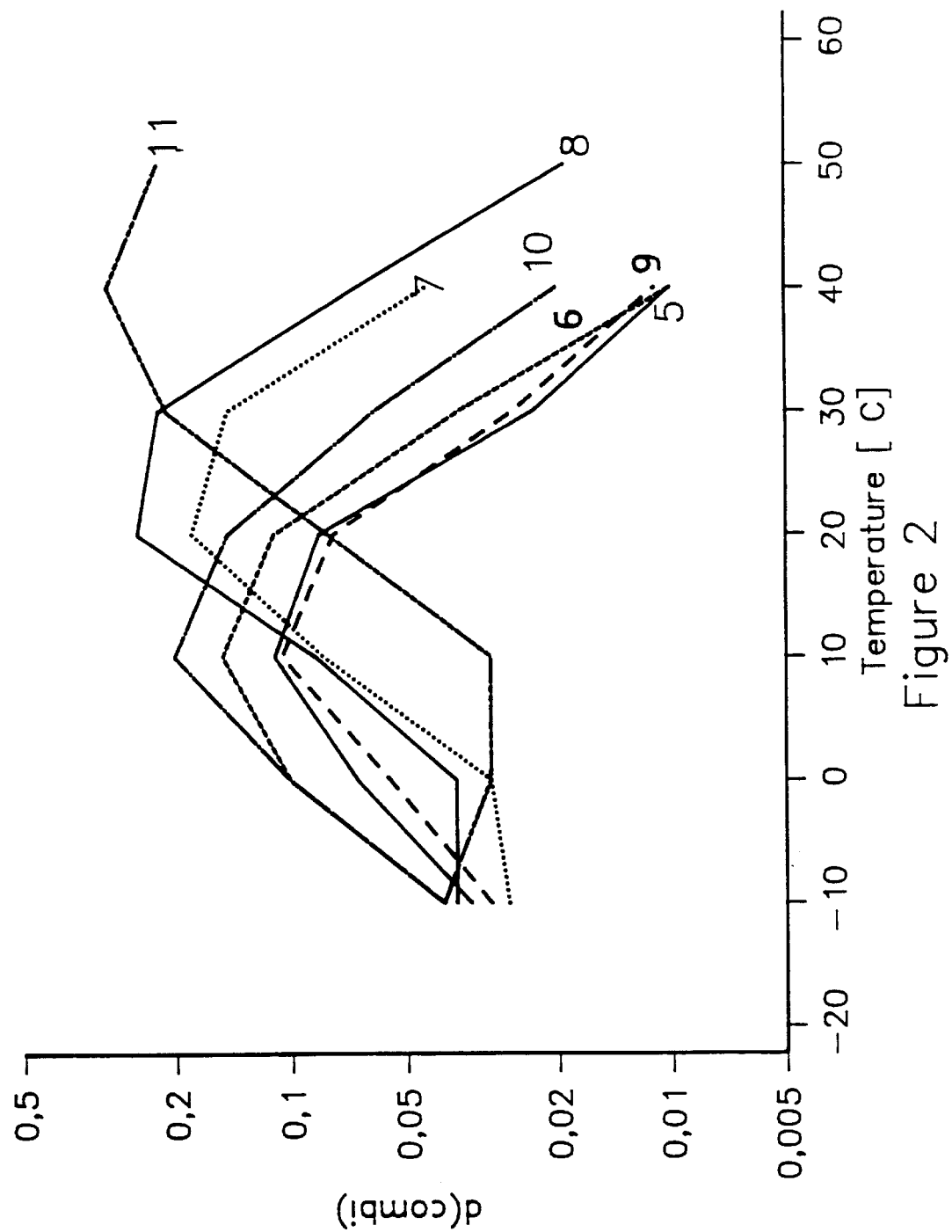
Figure 3:
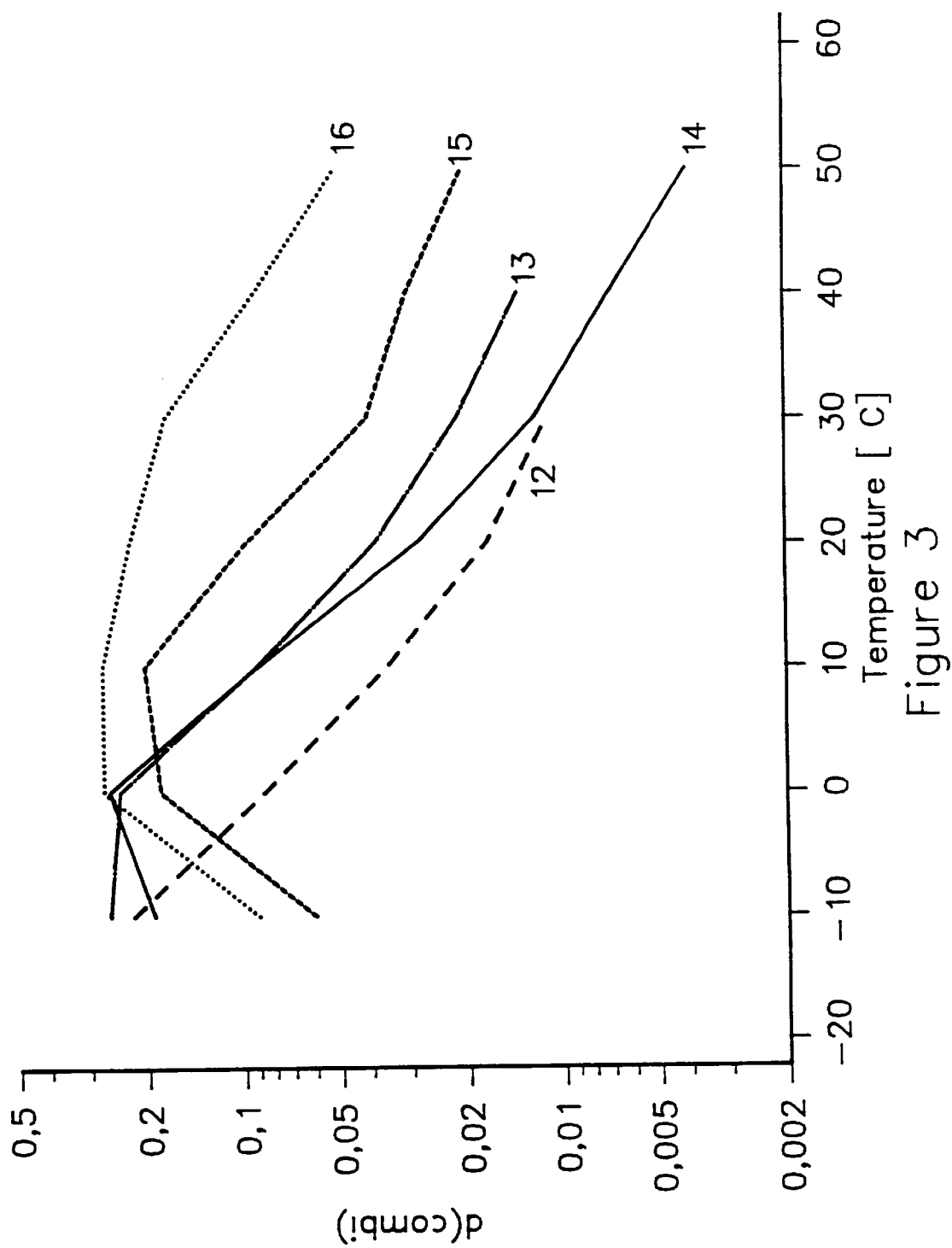

Explanation of FIGS. 1 to 3

FIGS. 1 to 3 show graphs of the combined loss factor at 200 Hz of the coated steel strips versus temperature according to DIN 53440 part 3. The test samples were prepared as described above. Most of the samples have been prepared at two different coating thicknesses to compensate for normal thickness deviations between different formulations.

FIG. 1 shows the loss factor of a conventional PVC-plastisol from comparative example 1 (1,2) versus a composition according to example 1 (3,4).

| curve | formulation | coating thickness |
|---|---|---|
| 1: | comp. example 1, | 2.27 mm |
| 2: | comp. example 1, | 4.52 mm |
| 3: | example 1, | 2.2 mm |
| 4: | example 1, | 4.5 mm. |

FIG. 2 illustrates how the factor and the temperature range over which a significant loss factor is observed (loss factor >0.1) can be varied by slight changes in the composition of the vulcanizing agents.

| curve | formulation | coating thickness |
|---|---|---|
| 5: | example 2, | 2.0 mm |
| 6: | example 2, | 2.45 mm |
| 7: | example 3, | 2.6 mm |
| 8: | example 3, | 3.5 mm |
| 9: | example 4, | 2.0 mm |
| 10: | example 4, | 2.65 mm |
| 11: | example 5, | 4.8 mm. |

FIG. 3 shows that the loss factor of a conventional vulcanized rubber composition of comparative example 2 is insignificant at normal service temperatures of a car (−5° C. to 30° C.) whereas the compositions of the inventive examples 6 and 7 have a significant loss factor at the normal service temperatures:

| curve | formulation | coating thickness |
|---|---|---|
| 12: | example 2 | 3.0 mm |
| 13: | example 6 | 3.1 mm |
| 14: | example 7 | 2.3 mm |
| 15: | example 7 | 2.3 mm |
| 16: | example 7 | 4.4 mm. |

All sealant/adhesive formulations of examples 1 to 7 had in addition to their superior damping properties the necessary properties for use as sealant/adhesive for body shop applications in the automotive industry.

What is claimed is:

1. A curable composition which when cured provides vibration dampening properties to thin gauge steel sheets and which is useful as a sealant, adhesive or coating consisting essentially of (a) from 5 to 40% by weight of 3,4-polyisoprene, (b) at least one curing agent, (c) at least one liquid rubber or elastomer, and (d) at least one additional member selected from the group consisting at finely divided polymer powders, fillers, adhesion promoters, plasticizers and liquid extenders, wherein said composition is curd after application to said thin gauge steel sheets.

2. A composition as claimed in claim 1 wherein said rubber is selected from the group consisting of homo- and copolymers of polybutadienes, 1,4-polyisoprenes, polyisobutylenes, polybutenes, styrene-butadiene-rubber, polyurethanes and polyexpoxides.

3. A composition as claimed in claim 1 wherein said curing agent is selected from the group consisting of vulcanizing agents consisting of sulfur, an organic accelerator, dicyanodiamide, carboxylic acid anhydrides and polyurethane catalysts.

4. A composition as claimed in claim 1 wherein said plasticizer or liquid extender is selected from the group consisting of $C_4$- to $C_{14}$-dialkylesters of phthalic acid, $C_4$- to $C_{14}$-dialkylesters of $C_3$- to $C_8$-dicarboxylic acid, aliphatic oils, aromatic oils, naphthenic oils, low molecular weight polybutenes, low molecular weight polyisobutylenes, high boiling hydrocarbon fluids, and mixtures thereof.

5. A composition as claimed in claim 1 wherein said adhesion promoter is selected from the group consisting of hydrocarbon resins, modified rosin acid, unmodified rosin acid, modified rosin esters, unmodified rosin esters, phenolic resins, terpene phenolic resins, epoxy resins, polyaminoamides, polyaminoethers, polymeric anhydrides of carboxylic acids, and monomeric anhydrides of carboxylic acids.

6. A method for joining or sealing joints between thin gauge steel sheets and providing vibration dampening properties to said steel sheets comprising coating at least one surface of said steel sheets with the composition of claim 1, assembling said steel sheets, and heating the assembled steel sheets to cure said composition.

7. A method of coating thin gauge steel sheets comprising applying the composition of claim 1 onto a surface of said steel sheets and heating the coated steel sheets to cure the coating.

8. A method as claimed in claim 7 wherein said applying is by spraying.

9. A method as claimed in claim 7 wherein said applying is by extruding.

10. A method for sealing, joining, or coating joints or surfaces of thin gauge steal sheets and providing vibration dampening properties to said steel sheets comprising applying a composition as claimed in claim 1 to said steel sheets and heating the composition to cure said composition.

11. A method as claimed in claim 10 wherein said composition is in the form of a ribbon.

12. A method as claimed in claim 10 wherein said composition is in the form of a tape.

13. A curable composition which when cured provides vibration dampening properties to thin gauge steel sheets and which is useful as a sealant, adhesive or coating which comprises:
   (a) from 5% to 40% by weight of 3,4-polyisoprene;
   (b) 5% to 50% by weight of at least one liquid rubber;
   (c) at least one curing agent, and
   (d) at least one additional member selected from the group consisting of finely divided thermoplastic polymer powders, fillers, adhesion promoters, plasticizers, stabilizers, antioxidants and liquid extenders, wherein the composition is cured after application to the thin gauge steel sheets.

14. The composition of claim 13 further comprising from 10% to 70% by weight of fillers.

15. The composition of claim 13 which comprises:
   (a) from 5% to 40% by weight of 3,4-polyisoprene;
   (b) 5% to 50% by weight of liquid rubber;
   (c) up to about 35% by weight of curing agents, accelerators and catalysts;
   (d) 0.1% to 5% by weight of stabilizers, 10% to 70% by weight of fillers, 5% to 20% by weight of tacifiers, 5% to 40% by weight of plasticizers and extenders, and optionally 0.5% to 10% by weight of adhesion promoters.

16. The composition of claim 13 containing from 5% to 20% by weight of 3,4-polyisprene.

17. The composition of claim 15 containing from 5% to 20% by weight of 3,4-polyisoprene.

18. The composition of claim 1 containing from 5% to 20% by weight of 3,4-polyisoprene.

* * * * *

UNITED STATES PATENT AND TRADEMARK OFFICE
CERTIFICATE OF CORRECTION

PATENT NO. : 6,204,321 B1
DATED : March 20, 2001
INVENTOR(S) : Lanoye

It is certified that error appears in the above-identified patent and that said Letters Patent is hereby corrected as shown below:

<u>Title page,</u>
Item [73], Assignee, delete "Henkel Corporation, Gulph Mills, PA (US)" and insert therefore -- Henkel Kommanditgesellschaft auf Aktien, Duesseldorf (DE) --.

<u>Column 7,</u>
Line 52, delete "at"; and insert therefor -- of --.
Line 54, delete "curd"; and insert therefor -- cured --.

<u>Column 8,</u>
Line 27, delete "steal"; and insert therefor -- steel --.

Signed and Sealed this

Twenty-second Day of April, 2003

JAMES E. ROGAN
*Director of the United States Patent and Trademark Office*